United States Patent
Lee et al.

(10) Patent No.: US 12,434,413 B2
(45) Date of Patent: Oct. 7, 2025

(54) POUCH MOLDING APPARATUS AND METHOD

(71) Applicant: LG Energy Solution, Ltd., Seoul (KR)

(72) Inventors: Chung Hee Lee, Daejeon (KR); Beom Su Kim, Daejeon (KR); Yong Nam Kim, Daejeon (KR); Dong Hyeuk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/289,065

(22) PCT Filed: Dec. 12, 2022

(86) PCT No.: PCT/KR2022/020134
§ 371 (c)(1),
(2) Date: Oct. 31, 2023

(87) PCT Pub. No.: WO2023/121095
PCT Pub. Date: Jun. 29, 2023

(65) Prior Publication Data
US 2024/0217145 A1   Jul. 4, 2024

(30) Foreign Application Priority Data
Dec. 20, 2021   (KR) ........................ 10-2021-0183205

(51) Int. Cl.
*B29C 43/36* (2006.01)
*B29C 43/52* (2006.01)
(Continued)

(52) U.S. Cl.
CPC ............. *B29C 43/36* (2013.01); *B29C 43/52* (2013.01); *B29C 2043/3283* (2013.01); *B29C 2043/3665* (2013.01); *B29L 2031/7146* (2013.01)

(58) Field of Classification Search
None
See application file for complete search history.

(56) References Cited

U.S. PATENT DOCUMENTS

| 11,040,501 B2 | 6/2021 | Cauchois et al. |
| 2005/0127566 A1 | 6/2005 | Chotard |

(Continued)

FOREIGN PATENT DOCUMENTS

| CN | 108288682 A | 7/2018 |
| CN | 109176723 A | 1/2019 |

(Continued)

OTHER PUBLICATIONS

EP1543942 Chotard 2005 text limited (Year: 2005).*

(Continued)

*Primary Examiner* — Jacob T Minskey
*Assistant Examiner* — Adrien J Bernard
(74) *Attorney, Agent, or Firm* — Lerner David LLP (57) ABSTRACT

A pouch molding apparatus and method involves deforming a pouch so that a larger amount of clearance is secured to increase the capacity of the pouch, thereby improving the pouch molding process to increase the depth and capacity of a pouch cup part. The pouch molding apparatus includes a die and a punch. The die has a die groove recessed therein in a shape configured to mold a pouch. The punch is disposed above the die groove, wherein the punch includes a body part configured to be inserted into the die groove together with a pouch film disposed between the die and the punch, and pressing parts are provided on opposite sides of the body part to press the pouch film toward an inner surface of the die groove.

16 Claims, 5 Drawing Sheets

(51) Int. Cl.
  *B29C 43/32* (2006.01)
  *B29L 31/00* (2006.01)

(56) References Cited

U.S. PATENT DOCUMENTS

| | | |
|---|---|---|
| 2008/0191387 A1 | 8/2008 | Sijpkes et al. |
| 2015/0239029 A1 | 8/2015 | Yamamoto et al. |
| 2017/0021979 A1 | 1/2017 | Lai et al. |
| 2019/0366654 A1 | 12/2019 | Ueno et al. |
| 2020/0083493 A1 | 3/2020 | Lee |
| 2020/0168853 A1 | 5/2020 | Kim et al. |
| 2020/0282627 A1 | 9/2020 | Kim et al. |
| 2020/0406528 A1 | 12/2020 | Jung et al. |
| 2021/0226282 A1 | 7/2021 | Grau et al. |
| 2023/0173737 A1 | 6/2023 | Jung et al. |

FOREIGN PATENT DOCUMENTS

| | | |
|---|---|---|
| CN | 209329063 U | 8/2019 |
| EP | 1543942 A1 | 6/2005 |
| EP | 1888322 B1 | 6/2015 |
| JP | H04293920 A | 10/1992 |
| JP | H05177697 A | 7/1993 |
| JP | 2009291953 A | 12/2009 |
| JP | 2017513781 A | 6/2017 |
| JP | 2019209572 A | 12/2019 |
| JP | 2020514989 A | 5/2020 |
| JP | 202087902 A | 6/2020 |
| JP | 2020179419 A | 11/2020 |
| KR | 20150003358 U | 9/2015 |
| KR | 101644282 B1 | 7/2016 |
| KR | 20160122798 A | 10/2016 |
| KR | 20170124882 A | 11/2017 |
| KR | 20180134133 A | 12/2018 |
| KR | 20190061572 A | 6/2019 |
| KR | 20200052061 A | 5/2020 |
| KR | 20200061034 A | 6/2020 |
| KR | 102150010 B1 | 8/2020 |
| KR | 102245128 B1 | 4/2021 |
| WO | 2019081062 A2 | 5/2019 |

OTHER PUBLICATIONS

Extended European Search Report including Written Opinion for Application No. 22911728.8 dated Aug. 27, 24, pp. 1-12.
International Search Report for PCT/KR2022/020134 mailed Mar. 21, 2023. 3 pages.

* cited by examiner

POUCH MOLDING APPARATUS AND METHOD

CROSS-REFERENCE TO RELATED APPLICATIONS

The present application is a national phase entry under 35 U. S. C. § 371 of International Application No. PCT/KR2022/020134 filed on Dec. 12, 2022, which claims the benefit of the priority of Korean Patent Application No. 10-2021-0183205, filed on Dec. 20, 2021, all of which is hereby incorporated herein by reference in its entirety.

TECHNICAL FIELD

The present disclosure relates to a pouch molding apparatus and method, and more particularly, to a pouch molding apparatus and method for molding a pouch used in manufacturing a secondary battery.

BACKGROUND ART

In recent years, the price of energy sources increases due to the depletion of fossil fuels, interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

Batteries storing electrical energy may be generally classified into primary batteries and a secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged. When the oxidation reaction to the material is performed by the current, power is discharged. Such charging-discharging are repeatedly performed to generate electricity.

In general, types of the secondary battery include nickel cadmium batteries, nickel hydrogen batteries, lithium ion batteries, and lithium ion polymer batteries. In particular, in terms of materials, there is a high demand for the lithium secondary batteries such as the lithium ion batteries, the lithium ion polymer batteries, and the like, which have advantages such as a high energy density, a discharge voltage, and output stability.

Such a secondary battery is manufactured by accommodating an electrode assembly, in which stacked unit cells are gathered, in a specific case. Such a secondary battery is classified into a pouch-type secondary battery and a can-type secondary battery according to a material of a case accommodating the electrode assembly.

Among them, the pouch-type secondary battery is manufactured in a manner, in which an electrode assembly is accommodated in a pouch made of a flexible polymer material having a variable shape. A pouch that is a case of the pouch-type secondary battery is manufactured by forming a cup part on a pouch film made of a flexible material. That is, when the cup part having an accommodation space for accommodating the electrode assembly is formed in the pouch film, the electrode assembly is accommodated in the accommodation space of the cup part, and a sealing part is sealed to manufacture a secondary battery.

In a process of forming a cup part in the pouch film as described above, a pouch molding apparatus is required, but there is a problem in that a depth and capacity of the cup part molded by the pouch molding apparatus according to the related art are insufficient.

In order to solve this problem, there is a need for a method capable of increasing in molding depth and capacity of the cup part formed by the pouch molding.

DISCLOSURE OF THE INVENTION

Technical Problem

The various embodiments of the present invention have been made to solve the above problem, and an object of the present disclosure is a pouch molding apparatus in which a specific process is added in a pouch molding process to deform a pouch so that a large amount of clearance than an existing amount is secured to increase in capacity in an advantageous state for depth molding. That is, the present disclosure provides a pouch molding apparatus that is capable of improving moldability of a pouch to increase in depth and capacity of a pouch cup part.

Technical Solution

A pouch molding apparatus according to the present disclosure includes a die in which a die groove recessed in a shape, in which a pouch is molded, is formed, and a punch disposed above the die groove, wherein the punch may include a body part inserted into the die groove together with a pouch film disposed between the die and the punch, and a pressing part provided on each of both surfaces of the body part to press the pouch film toward an inner surface of the die groove.

In the punch, a bottom surface of the body part and a bottom surface of the pressing part may be disposed on one plane.

The pressing part may include a horizontal portion disposed above the body part, and a vertical portion extending downward from one side of the horizontal portion and disposed on an outer surface of the body part to press an inner surface of the pouch film.

In the punch, a bottom surface of the horizontal portion and a top surface of the body part may be spaced apart from each other.

The punch may further include a linear motion guide disposed between a top surface of the body part and a bottom surface of the horizontal portion to guide movement of the pressing part.

The punch may further include a heating part disposed adjacent to the pressing part to apply heat to the pouch film pressed by the pressing part.

The heating part may be disposed at an opposite side of the body part with respect to the pressing part.

The pouch molding apparatus may further include a cylinder disposed above the body part to move the pressing part toward an inner surface of the die groove.

The pouch molding apparatus may further include an elevator connected to an upper portion of the punch so that the punch approaches the die groove and is spaced apart from the die groove, wherein the cylinder may be coupled to a circumference of the elevator.

The punch may further include a coupling part configured to couple the cylinder to the pressing part.

A pouch molding method according to the present disclosure may include a disposing process of disposing a pouch film between a die, in which a die groove is formed, and a punch disposed above the die groove, a primary molding process of molding the pouch film while a body part of the punch is inserted into the die groove together with the pouch film, and a secondary molding process of allowing a plurality of pressing parts respectively provided on both surfaces of the body part to press the pouch film toward an inner surface of the die groove after the primary molding process.

In the secondary molding process, the pressing parts may press the pouch film, and simultaneously, a heating part provided in each of the pressing parts may apply heat.

In the secondary molding process, a state in which the pressing parts press the pouch film toward the inner surface of the die groove may be maintained for a predetermined time.

Advantageous Effects

The pouch molding apparatus according to the present disclosure may include the die, in which the die groove recessed in a shape, in which a pouch is molded, is formed, and the punch disposed above the die groove, and the punch may include the body part inserted into the die groove together with the pouch film disposed between the die and the punch and the pressing part provided on each of both the surfaces of the body part to press the pouch film toward the inner surface of the die groove.

Therefore, the pouch molding apparatus may deform the pouch by adding the specific process in the pouch molding process so that the large amount of clearance than the existing amount is secured to increase in capacity in the advantageous state for the depth molding. Therefore, the moldability of the pouch may be improved to increase in depth and capacity of the cup part of the pouch.

DETAILED DESCRIPTION

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the embodiments of the present invention, detailed descriptions of portions that are irrelevant to the description or related known technologies that may unnecessarily obscure the gist of the embodiments of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

Embodiment 1

The present disclosure provides a pouch molding apparatus as Embodiment 1.

Figure 1:
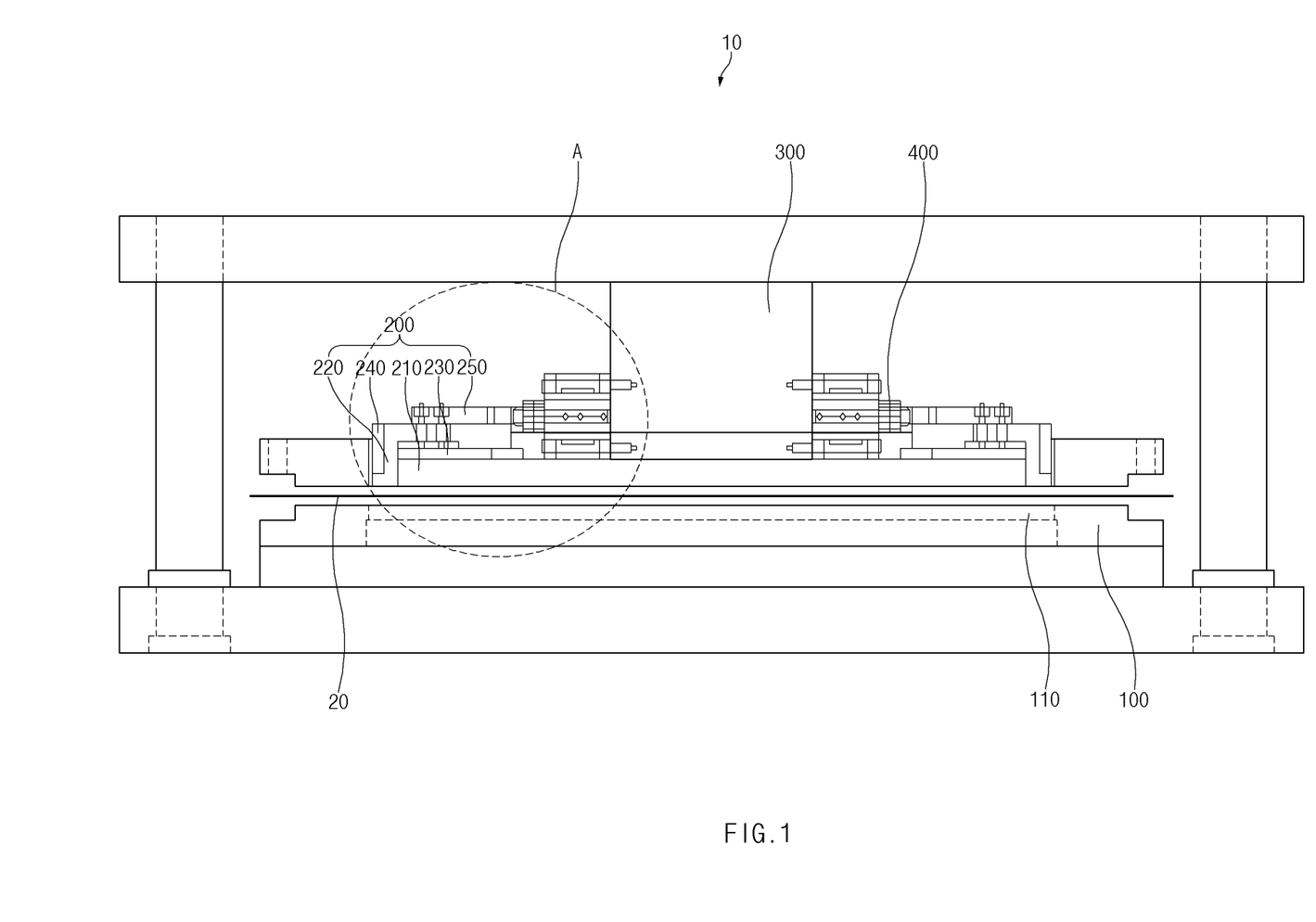
FIG. 1 is a schematic front view illustrating a pouch molding apparatus according to Embodiment 1 of the present invention.

FIG. 1 is a schematic front view illustrating a pouch molding apparatus 10 according to Embodiment 1 of the present invention.

The pouch molding apparatus 10 may be an apparatus for molding a pouch used for manufacturing a secondary battery, and specifically, may be used for molding a cup part having an accommodation space for accommodating an electrode assembly. Referring to FIG. 1, the pouch molding apparatus according to Embodiment 1 of the present invention may include a die 100, a punch 200, and an elevator 300.

The pouch molding apparatus 10 may require a recessed space having the same shape as the accommodation space for accommodating the electrode assembly to form the pouch. As an example of a configuration including such a space, the pouch molding apparatus 10 according to Embodiment 1 of the present invention may include the die 100.

The die 100 may be disposed below the pouch molding apparatus 10 and may have a flat plate shape on a surface facing the punch 200 to be described later. However, this is only one example and is not necessarily limited thereto.

The die 100 may have a die groove 110 recessed into a shape in which the pouch film 20 is formed at a center of a top surface thereof. That is, the die groove 110 may be formed as a space into which the punch 200 is introduced. The punch 200 may press the pouch film 20 disposed on the die 100 while moving into the die groove 110 formed in the die 100, and thus, the pouch film 20 may be molded in the shape of the die groove 110.

In general, the pouch used for manufacturing a pouch-type secondary battery may include a space having a rectangular shape when viewed downward from the top to accommodate the electrode assembly. Thus, the die groove 110 formed in the die 100 according to the present disclosure may form a rectangular parallelepiped-shaped empty space. However, the space of the die groove 110 is not necessarily limited thereto and may vary depending on the shape of the required pouch.

Figure 2:
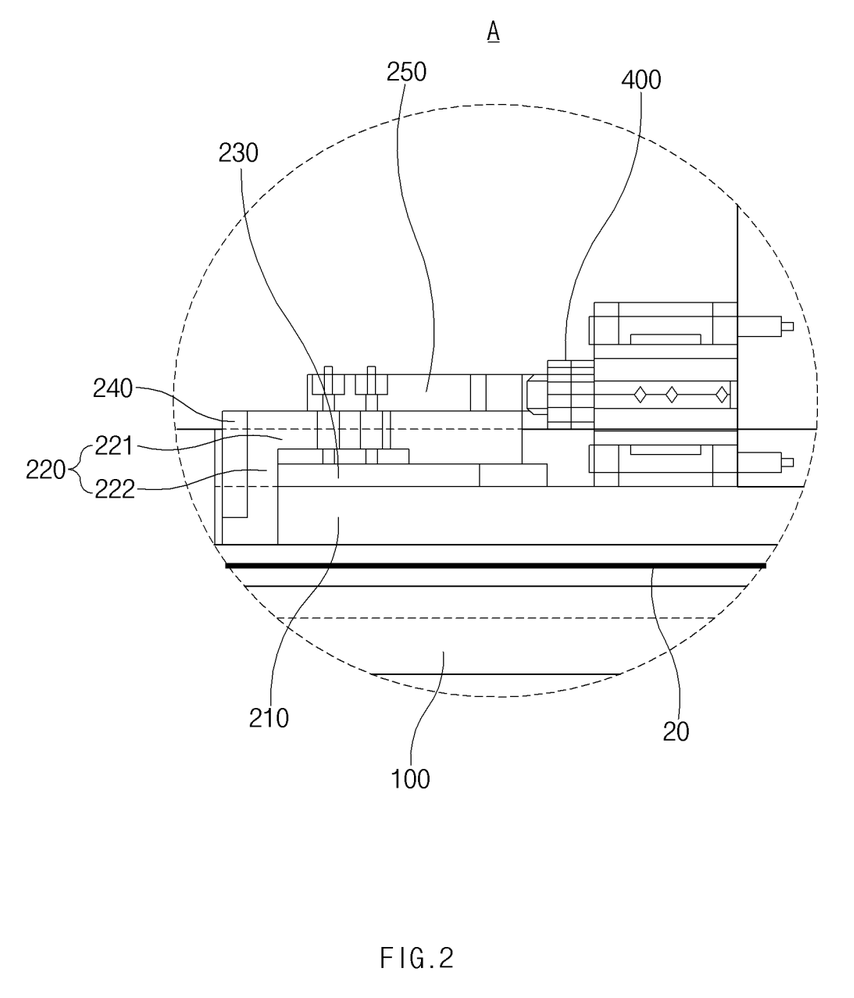
FIG. 2 is an schematic enlarged view illustrating a portion A of FIG. 1.

FIG. 2 is an schematic enlarged view illustrating a portion A of FIG. 1.

As an example of a configuration for pressing the die 100 described above, the pouch molding apparatus 10 according to Embodiment 1 of the present invention may include the punch 200.

Since the punch 200 molds the pouch film 20 while being inserted into the die groove 110 formed in the die 100, the punch 200 may have the same shape as the space formed by the die groove 110. However, since the punch 200 presses the pouch film 20 while being introduced into the die groove 110, an area of a bottom surface of the punch 200 may be less than that of a bottom surface of the die groove 110.

As an example of a method for pressing the pouch film 20 by the punch 200, not only the punch 200 may descend to be inserted into the die groove 110, but also the die 100 may ascend so that the punch 200 is inserted into the die groove 110 to press the pouch film 20. In various embodiments of the present invention, a case in which the punch 200 descends to be inserted into the die groove 110 up to a specific depth will be described as an example.

The punch 200 may be disposed above the die groove 110 so as to be movable vertically. The pouch film 20 to be molded may be disposed on the top surface of the die 100 or disposed between the die 100 and the punch 200, and the punch 200 may descend toward the pouch film 20 disposed at a predetermined position. While the punch 200 descends toward the pouch film 20, the punch 200 may descend together with the pouch film 20 from the moment at which the punch 200 is in contact with the pouch film 20. The punch 200 may descend to the inside of the die groove 110 by a set depth together with the pouch film 20, and after the pouch film 20 is formed while descending to a set depth together with the punch 200, the descending of the punch 200 may be stopped. When the molding of the pouch film 20 is completed, the punch 200 may ascend toward the original position again.

As an example of a configuration for vertically moving the punch 200 disposed above the die groove 110, the pouch molding apparatus 10 according to Embodiment 1 of the present invention may include the elevator 300.

The elevator 300 may be connected to an upper portion of the punch 200 to move the punch 200 vertically while approaching or separating from the die groove 110.

The elevator 300 is not particularly limited in shape as long as the elevator 300 moves the punch 200 by being connected to the punch 200. Preferably, the elevator 300 may have a cylinder shape capable of moving the punch 200 vertically using a pressure or the like and thus may have a cylindrical shape.

Referring to FIG. 2, the punch 200 may include various components that are necessary for forming the pouch. Among them, the body 210 of the punch 200 may be inserted into the die groove 110 together with the pouch film 20 disposed between the die 100 and the punch 200.

The body part 210 may have a shape in which the pouch film 20 is easily inserted into the die groove 110 by pressing the pouch film 20. As an example, the body part 210 may have a rectangular parallelepiped shape. Therefore, since the bottom surface of the body part 210 presses the pouch film 20 to descend into the die groove 110 by a set depth, the body part 210 may preferably have a flat bottom surface. Since the shape of the body part 210 described in the present disclosure is merely an example, the present invention is not limited thereto.

The pouch molding apparatus 10 according to the present disclosure is characterized in that an additional molding process of being pressed toward both surfaces after molding due to the descending of the punch 200. As an example of a configuration for the additional molding process, the punch 200 may include a pressing part 220.

The pressing part 220 may be provided on each of both surfaces of the body part 210 to press the pouch film 20 toward an inner surface of the die groove 110. Particularly, after the punch 200 descends together with the pouch film 20 up to the inside of the die groove 110 by a set depth, the pressing part 220 may press the pouch film 20 toward the inner surface formed on each of both sides of the die groove 110.

Here, when the body part 210 has a rectangular parallelepiped shape having a rectangular bottom surface, the body part 210 may include two surfaces including two long sides among rectangular four sides of the bottom surface.

A distance between the pressing part 220 and the die groove 110 may be reduced through a process in which the pressing part 220 of the punch 200 presses the pouch film 20 toward the inner surface of the die groove 110. That is, the distance between the pouch film 20 and the inner surface of the die groove 110 may be reduced, and the molded capacity of the pouch film 20 may increase.

As an example of deformation by the pressing, the distance between the pressing part 220 and the die groove 110, which may be about 2.5 mm before the pressing of the pressing part 220, may be reduced to about 0.5 mm after the pressing. That is, the distance between the pressing part 220 and the die groove 110 may be reduced by about 4 mm through coupling of both the surfaces, and a degree of molding of the pouch film 20 may be changed.

When molding the pouch used in the pouch-type secondary battery, a large clearance between the die 100 and the punch 200 may occur, and thus, this may be advantageous in molding a depth of the space in which the electrode assembly is accommodated. The pouch molding apparatus 10 according to the present disclosure may generate an effect of increasing in capacity while securing the clearance through the molding process using the pressing part 220 of the punch 200.

As an example of a configuration for molding the pouch film 20 into a flat shape of a lower portion when molding the pouch film 20 due to the descending of the punch 200, in the punch 200 of the pouch molding apparatus 10 according to Embodiment 1 of the present invention, a bottom surface of the body part 210 and a bottom surface of the pressing part 220 may be disposed on one plane.

The body part 210 and the pressing part 220 of the punch 200 may simultaneously descend to press the pouch film 20. Thus, both the bottom surface of the body part 210 and the pressing part 220 may be in contact with the pouch film 20. If the body part 210 and the bottom surface of the pressing part 220 are disposed on the one plane, one surface of the pouch film 20 pressed by the body part 210 and the bottom surface of the pressing part 220 may be molded into the flat surface. However, if the bottom surfaces of the body part 210 and the pressing part 220 are not disposed on the one plane, an uneven surface may be formed on one surface of the pouch film 20 due to a height difference between the bottom surfaces.

Thus, the bottom surfaces of the body part 210 and the pressing part 220 disposed on the one plane may generate an effect of forming the even surface of the molded pouch.

An edge of the bottom surface of the pressing part 220, which is in contact with the pouch film 20, may have a rounded shape. The process of pressing the pouch film 20 toward the inner surface of the die groove 110 by the pressing part 220 is a process added after the punch 200 presses the pouch film 20 while the descending. Therefore, a problem such as tearing by the edge that is in contact with the pouch film 20 on the bottom surface of the pressing part 220 may occur on the surface of the pouch film 20 that is molded already. In order to reduce possibility of occurrence of such the problem, a portion of the edge of the pressing part 220 may be processed to be rounded.

As an example of a configuration in which the pressing part 220 of the punch 200 easily presses the pouch film 20 in a horizontal direction toward the inner surface of the die groove 110, the pressing part 220 of the punch 200 of the present disclosure may include a horizontal portion 221 and a vertical portion 222.

The horizontal portion 221 may be disposed above the body part 210, and the vertical portion 222 may extend downward from one side of the horizontal portion 221 and be disposed on an outer surface of the body part 210.

When viewed from the front surface with reference to FIG. 2, the horizontal portion 221 may have a rectangular parallelepiped shape having a rectangular cross-section of which a width is greater than a length. When viewed from the front surface with reference to FIG. 2, the vertical portion 222 may have a rectangular parallelepiped shape having a rectangular cross-section of which a length is less than a width. Thus, the pressing part 220 may have a ¬-shaped cross-section or a reversed ¬-shaped cross-section when viewed from the front. Since the shape of the pressing part 220 according to Embodiment 1 is merely one example, this embodiment is not limited thereto.

The pressing part 220 may be configured to receive force that is necessary for pressing in the horizontal direction due to the horizontal portion 221 of the pressing part 220 and press the inner surface of the pouch film 20 due to the vertical portion 222.

As an example of a configuration for easily moving the pressing part 220 in the horizontal direction, in the punch 200 of the pouch molding apparatus 10 according to Embodiment 1 of the present invention, a bottom surface of the horizontal portion 221 and a top surface of the body part 210 may be spaced apart from each other.

If the bottom surface of the horizontal portion 221 and the top surface of the body part 210 are spaced apart from each other so that an empty space is formed between the horizontal portion 221 and the body part 210, when the pressing part 220 moves in the horizontal direction to press the pouch film 20, friction will not occur between the horizontal portion 221 and the body part 210, the horizontal movement of the pressing part 220 may be efficient. In addition, an additional configuration for improving efficiency of the horizontal movement of the pressing part 220 may be disposed.

As an example of an additional configuration for improving efficiency of the horizontal movement of the pressing part 220, the punch 200 of the pouch molding apparatus 10 according to Embodiment 1 of the present invention may further include a linear motion guide 230. The linear motion guide 230 may be a configuration capable of guiding a linear motion to perform the linear motion that helps a ball inside so as to perform an infinite circulation motion.

The linear motion guide 230 may be disposed between the top surface of the body part 210 and the bottom surface of the horizontal portion 221. As described above, when the bottom surface of the horizontal portion 221 and the top surface of the body part 210 are spaced apart from each other, the linear motion guide 230 may be disposed in the empty space between the horizontal portion 221 and the body part 210.

The linear motion guide 230 may guide the horizontal movement of the pressing part 220. That is, when the pressing part 220 presses the pouch film 20 toward the inner surface of the die groove 110, efficient movement of the pressing part 220 may occur.

As an example of a configuration used in an additional process for efficiently molding the shape of the pouch film 20, the punch 200 of the pouch molding apparatus 10 according to Embodiment 1 of the present invention may further include a heating part 240.

The heating part 240 may be disposed adjacent to the pressing part 220 to apply heat to the pouch film 20 pressed by the pressing part 220. That is, the heating part 240 may additionally apply heat to the pouch film 20 after the pressing part 220 presses the pouch film 20.

Due to the heating part 240 applying the heat, an effect of improving molding efficiency may occur compared to when the pouch film 20 is molded only by a pressure.

Since the heating part 240 applies the heat to the pouch film 20 in various manners, a detailed description thereof will be omitted.

As an example of a configuration for efficiently applying the heat to the pouch film 20, the heating part 240 may be disposed at an opposite side of the body part 210 with respect to the pressing part 220. That is, the heating part 240 may be disposed to be in contact with the inner surface of the pouch film 20 pressed by the pressing part 220.

When the heating part 240 is disposed at the opposite side of the body part 210 with respect to the pressing part 220, the heating part 240 may apply the heat after pressing the inner surface of the pouch film 20 together when the pressing part 220 presses the inner surface of the pouch film 20.

The heating part 240 may be disposed on a portion of the surface on which the pressing part 220 presses the inner surface of the pouch film 20 or may be disposed on the entire surface.

Due to the arrangement of the heating part 240, since the heating part 240 may directly apply the heat to the surface of the pouch film 20, the effect of improving the efficiency of the heat application process may occur.

As an example of a configuration in which the pressing part 220 provides a pressure for pressing the inner surface of the pouch film 20, the pouch molding apparatus 10 according to Embodiment 1 of the present invention may further include a cylinder 400.

The cylinder 400 may be disposed above the body part 210 to move the pressing part 220 toward the inner surface of the die groove 110 so that the pressing part 220 presses the inner surface of the pouch film 20. That is, the cylinder 400 may provide force for the horizontal movement of the pressing part 220.

The cylinder 400 should be able to push the pressing part 220 toward the inner surface of the die groove 110 or pull the pressing part 220 back to its original position. For example, the cylinder 400 may be a pressure cylinder or a hydraulic cylinder capable of providing force in the horizontal direction to the pressure unit 220 through a configuration such as a piston. Since the pressure cylinder or hydraulic cylinder is a commonly used and well-known configuration, a detailed description thereof will be omitted. Since this is merely examples of the cylinder 400, this embodiment is not necessarily limited thereto, and the force may be provided to the pressing part 220 in other manners.

The cylinder 400 may be coupled to a circumference of the elevator 300 to ensure stability. When the cylinder 400 is coupled to the elevator 300, movement such as vibration that may occur in the cylinder 400 when the cylinder 400 provides force for moving the pressing part 220 may be reduced.

As an example of a configuration for efficiently moving the pressing part 220 by the cylinder 400, the punch 200 of the pouch molding apparatus 10 according to Embodiment 1 of the present invention further includes a coupling part 250.

The coupling part 250 may be disposed above the horizontal portion 221 to couple the cylinder 400 and the pressing part 220 to each other. Specifically, the coupling part 250 may have one side connected to the pressing part 220 and the other side connected to the cylinder 400 to couple the pressing part 220 to the cylinder 400. When one side of the coupling part 250 is connected to the pressing part 220, a component such as a pin or bolt may pass through one side of the coupling part 250 and the horizontal portion 221 of the pressing part 220 in the vertical direction so as to be connected to each other. In addition, when the other side of the coupling part 250 is connected to the cylinder 400, a portion of the cylinder 400 extending toward the coupling part 250 may be connected in a manner such as being fitted. Since this is merely an example of the connection method, the connection methods between the coupling part 250 and the pressing part 220 and between the coupling part 250 and the cylinder 400 may vary.

When an additional component such as the linear motion guide 230 is disposed below the horizontal portion 221, the cylinder 400 may be directly connected to the pressing part 220, and thus, it difficult to apply force. Even in this case, the coupling part 250 may generate an effect in which the force provided by the cylinder 400 is efficiently transmitted to the pressing part 220.

Figure 3:
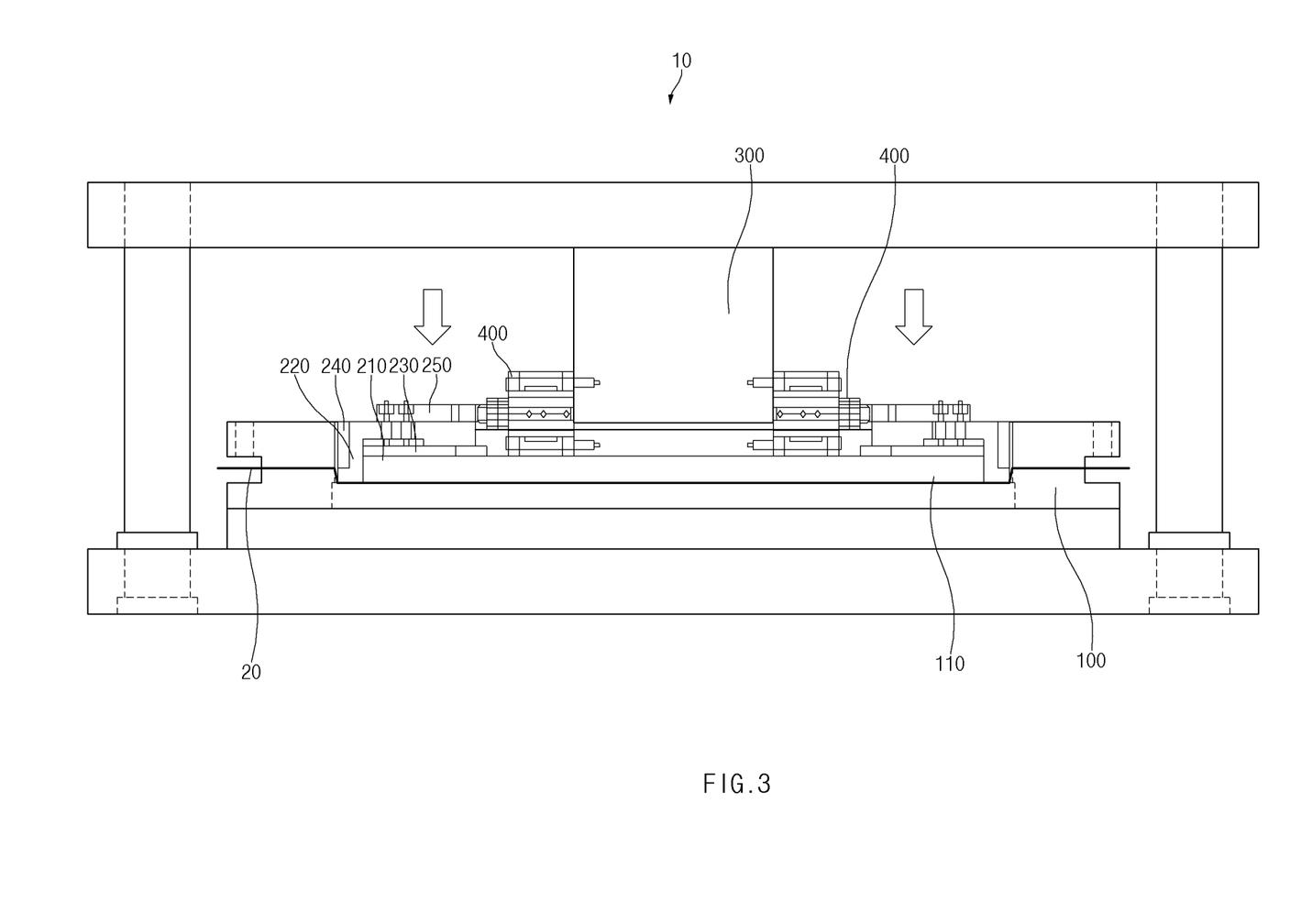
FIG. 3 is a schematic front view illustrating a state in which a punch of the pouch molding apparatus approaches a die groove according to Embodiment 1 of the present invention.
Figure 4:
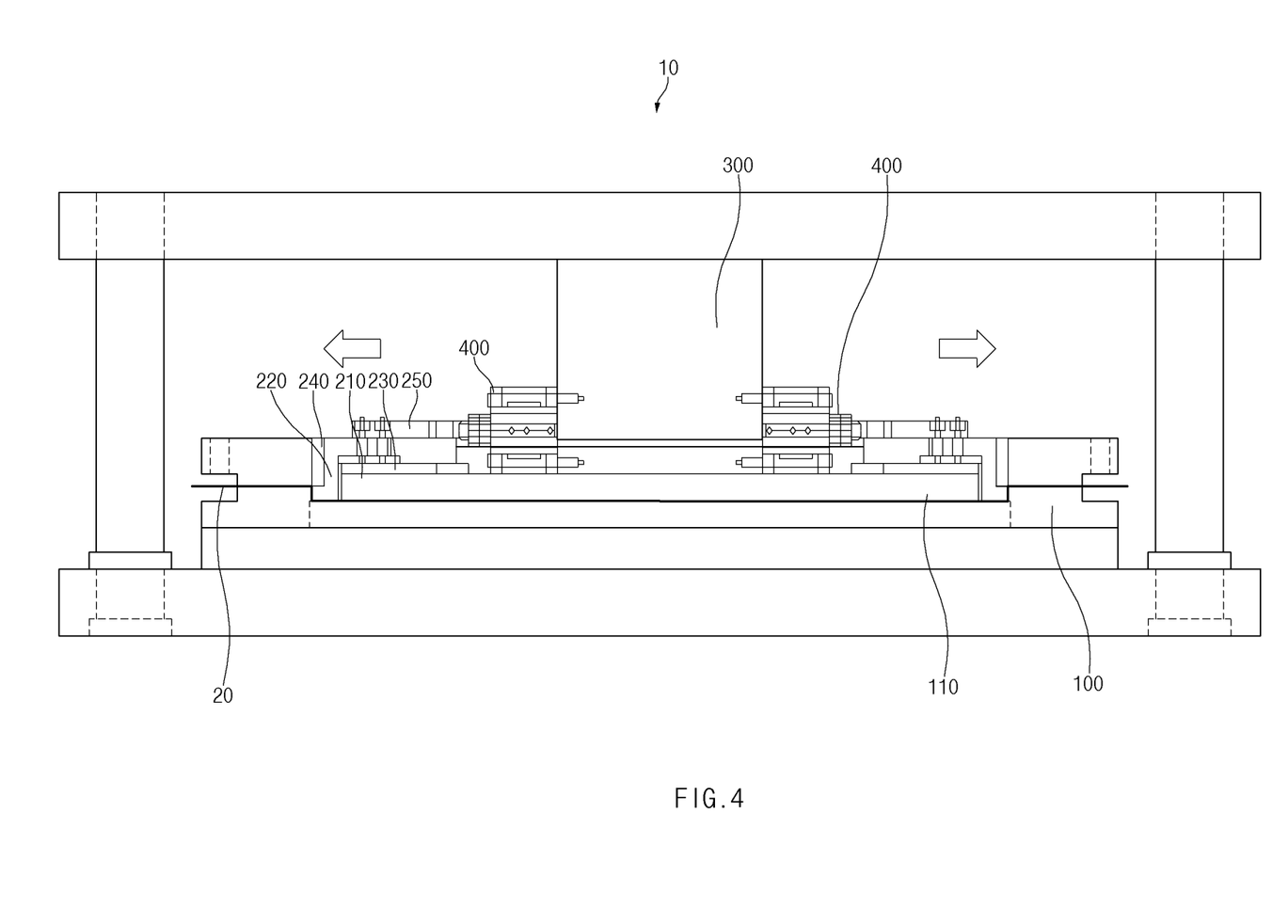
FIG. 4 is a schematic front view illustrating a state in which a pressing part of the pouch molding apparatus presses a pouch film according to Embodiment 1 of the present invention.

FIG. 3 is a schematic front view illustrating a state in which the punch of the pouch molding apparatus approaches the die groove according to Embodiment 1 of the present invention, and FIG. 4 is a schematic front view illustrating a state in which the pressing part of the pouch molding apparatus presses the pouch film according to Embodiment 1 of the present invention.

The state of the pouch molding apparatus 10 according to each process will be described with reference to FIGS. 3 and 4.

Referring to FIG. 3, in the pouch molding apparatus 10 according to Embodiment 1 of the present invention, a portion of the pouch punch 200 may be inserted into the die groove 110 formed in the die 100 together with the film 20 while the punch 200 descends in the direction of the die 100 by the elevator 300. Thus, the bottom surface of the punch 200 may descend to the inside of the die groove 110 by a set depth together with the pouch film 20. Through this process, a depth of molding may be secured.

Referring to FIG. 4, in the pouch molding apparatus 10 according to Embodiment 1 of the present invention, in the state in which the bottom surface of the punch 200 descends to the inside of the die groove 110 by a set depth formed in the die 100, the pressing part 220 of the punch 200 may press the pouch film 20 toward the inner surface of the die groove 110. Specifically, when the cylinder 400 presses the coupling part 250, the pressing part 220 connected to the coupling part 250 may press the pouch film 20 while moving toward the inner surface of the die groove 110 by the linear motion guide 230.

Additionally, the heating part 240 may apply heat to the pouch film 20 while the pressing part 220 presses the pouch film 20.

The pouch molding apparatus 10 according to Embodiment 1 of the present invention may increase in molding depth and capacity of the pouch to generate an effect of improving moldability of a space accommodating the electrode assembly.

Embodiment 2

The present disclosure provides a pouch molding method as Embodiment 2.

Hereinafter, a detailed description of the same configuration as the pouch molding apparatus 10 according to Embodiment 1 of the present invention will be omitted.

Figure 5:
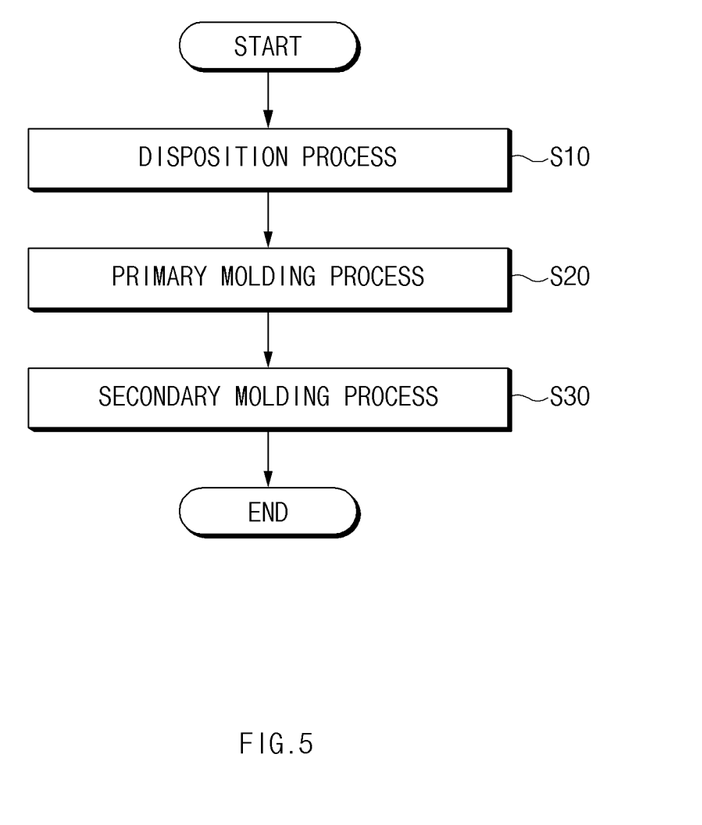
FIG. 5 is a schematic flowchart illustrating a pouch molding method according to Embodiment 2 of the present invention.

FIG. 5 is a schematic flowchart illustrating a pouch molding method according to Embodiment 2 of the present invention.

Referring to FIG. 5, a pouch molding method may include a disposing process (S10), a primary molding process (S20), and a secondary molding process (S30).

First, a process of disposing the pouch film 20 to be molded in the pouch molding apparatus 10 may be performed. In the disposing process (S10), the pouch film 20 may be disposed between a die 100 having a die groove 110 and a punch 200 disposed above the die groove 110.

When disposing the pouch film 20, the pouch film may be disposed to be in contact with a top surface of the die 100 above the die groove 110, and the pouch film 20 may be disposed between the die 100 and the punch 200 so as not to be in contact with the die 100.

After the disposing process (S10) of disposing the pouch film 20, the primary molding process (S20) may be performed. In the primary forming process (S20), the pouch film 20 may be molded while a body part 210 of the punch 200 is inserted into the die groove 110 together with the pouch film 20.

The punch 200 is inserted into the die groove 110 together with the pouch film 20 to form a space in the pouch film 20 to accommodate the electrode assembly. An elevator 300 connected to an upper portion of the punch 200 may move the punch 200 vertically, and the first forming process (S20) may proceed while the punch 200 descends by the elevator 300.

The body part 210 may be in contact with the pouch film 20 at a lower portion of the punch 200 to press the pouch film 20. Therefore, after the first forming process (S20) is performed, a bottom surface of the body part 210 may be in a state of descending up to the inside of the die groove 110 by a set depth.

After the depth forming of the pouch film 20 is completed by the first forming process (S20), the secondary forming process (S30) may proceed. In the secondary forming process (S30), a plurality of pressing parts 220 provided at both sides of the body part 210 after the primary forming process (S20) may press the pouch film 20 toward an inner surface of the die groove 110.

The pressing parts 220 may be provided at both the sides of the body part 210, respectively. As the pressing part 220 horizontally moves in a direction away from the body part 210 to press the pouch film 20, additional molding may be possible on the pouch film 20.

An electrode assembly accommodation space formed in the pouch by the secondary molding process (S30) may secure more capacity.

In the secondary forming process (S30) of the pouch molding method according to Embodiment 2 of the present invention, the pressing parts 220 may press the pouch film 20 while a heating part 240 applies heat to the pouch film 20.

Specifically, the heating part 240 may be provided on an outer surface of the pressing part 220 to apply the heat to the pouch film 20. When the heating part 240 is provided on the outer surface of the pressing part 220, if the pressing parts 220 press the pouch film 20, the heating part 240 may also be in contact with the pouch film 20 to press the pouch 220 together with the pouch film 20, and simultaneously, to apply the heat to the pouch film 20.

When the pressing parts 220 press the pouch film 20, and also, the heating part 240 applies the heat to the pouch film 20, molding efficiency of the secondary molding process may be improved.

In the pouch molding method according to Embodiment 2 of the present invention, in the secondary forming process (S30), the pressing part 220 may maintain a state in which the pouch film 20 is pressed for a predetermined time.

That is, in a state in which the pressing part 220 presses the pouch film 20 while moving toward an inner surface of the die groove 110, the pressing part 220 may be stopped for a predetermined time period, and when the predetermined time period elapses, the pressing part 220 may move to its original position.

In the pouch molding method according to Embodiment 2 of the present invention, after the secondary molding process (S30), a process in which the punch 200 is spaced apart from the die 100 through the ascending motion of the elevator 300 to ascend to the original position may be additionally performed. As described above, a detailed description of the processes that may generally be involved is omitted.

In the pouch molding method according to Embodiment 2 of the present invention, capacity may increase by the secondary molding process (S30) in a state in which a depth of the molding is advantageously secured by securing a large clearance in the primary molding process (S20).

In addition, a shape of the pouch molded according to the pouch molding method using the pouch molding apparatus of the present disclosure may be molded so that the inner surface of the pouch film 20 has a shape closer to that of an outer surface of the punch 200 compared to a case in which the process, in which the pressing part 220 of the punch 200 presses the pouch film 20 is not added.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Pouch molding apparatus
20: Pouch film
100: Die
110: Die groove
200: Punch
210: Body part
220: Pressing part
221: Horizontal portion
222: Vertical portion
230: Linear motion guide
240: Heating part
250: Coupling part
300: Elevator
400: Cylinder

The invention claimed is:

1. A pouch molding apparatus for manufacturing a secondary battery, by molding a cup part having an accommodation space for accommodating an electrode assembly, comprising:
a die including a die groove recessed therein and in a shape configured to mold a pouch; and
a punch disposed above the die groove,
wherein the punch comprises:
a body part configured to be advanced along a vertical direction so as to be inserted into the die groove together with a pouch film disposed between the die and the punch;
a first pressing part and a second pressing part each disposed on opposite sides of the body part, at least one of the first and second pressing parts configured to move transverse to the vertical direction so as to press the pouch film toward an inner surface of the die groove; and
a heating part moveable laterally with the first and second pressing parts so as to heat the pouch film.

2. The pouch molding apparatus of claim 1, wherein a bottom surface of the body part and a bottom surface of each of the first and second pressing parts are disposed on one plane.

3. The pouch molding apparatus of claim 1, wherein each of the first and second pressing parts comprise:
a horizontal portion disposed above the body part; and
a vertical portion extending downward from one side of the horizontal portion and disposed on an outer surface of the body part to press an inner surface of the pouch film.

4. The pouch molding apparatus of claim 3, wherein a bottom surface of each of the horizontal portions are spaced apart from a top surface of the body part.

5. The pouch molding apparatus of claim 3, wherein the punch further comprises a linear motion guide disposed between a top surface of the body part and a bottom surface of one of the horizontal portions, the linear motion guide configured to guide movement of one of the first or second pressing parts.

6. The pouch molding apparatus of claim 1, wherein the heating part is disposed adjacent to one of the first or second pressing parts such that the heating part is configured to apply heat to the pouch film.

7. The pouch molding apparatus of claim 6, wherein the heating part is disposed on an outer side of one of the first or second pressing parts opposite to the body part.

8. The pouch molding apparatus of claim 1, further comprising a cylinder disposed above the body part, the cylinder configured to move one of the first or second pressing parts toward the inner surface of the die groove.

9. The pouch molding apparatus of claim 8, further comprising an elevator connected to an upper portion of the punch, the elevator configured to move the punch toward and/or away from the die groove,
wherein the cylinder is coupled to the elevator.

10. The pouch molding apparatus of claim 8, wherein the punch further comprises a coupling part configured to couple the cylinder to one of the first or second pressing parts.

11. A pouch molding method comprising:
disposing a pouch film between a die having a die groove and a punch disposed above the die groove;
molding the pouch film by advancing a body part of the punch into the die groove together with the pouch film along a vertical direction; and moving a plurality of pressing parts disposed on opposite sides of the body part transverse to the vertical direction so as to press the plurality of pressing parts into the pouch film toward an inner surface of the die groove and a heating part laterally with the first and second pressing parts so as to heat the pouch film.

12. The pouch molding method of claim 11, further comprising applying heat to the pouch film through the heating part while pressing the heating part against the pouch film.

13. The pouch molding method of claim 11, wherein the plurality of pressing parts press the pouch film toward the inner surface of the die groove for a predetermined time.

14. The pouch molding apparatus of claim 1, wherein the heating part is disposed on a side of one of the first or second pressing parts opposite to the body part such that the heating part is configured to apply heat directly to the surface of the pouch film.

15. The pouch molding apparatus of claim 1, wherein the heating part is arranged to make direct contact with the pouch film.

16. The pouch molding method of claim 11, wherein the heating part is disposed on a side of one of the plurality of pressing parts opposite to the body part such that the heating part is configured to apply heat directly to the surface of the pouch film.

* * * * *